United States Patent Office 3,411,571
Patented Nov. 19, 1968

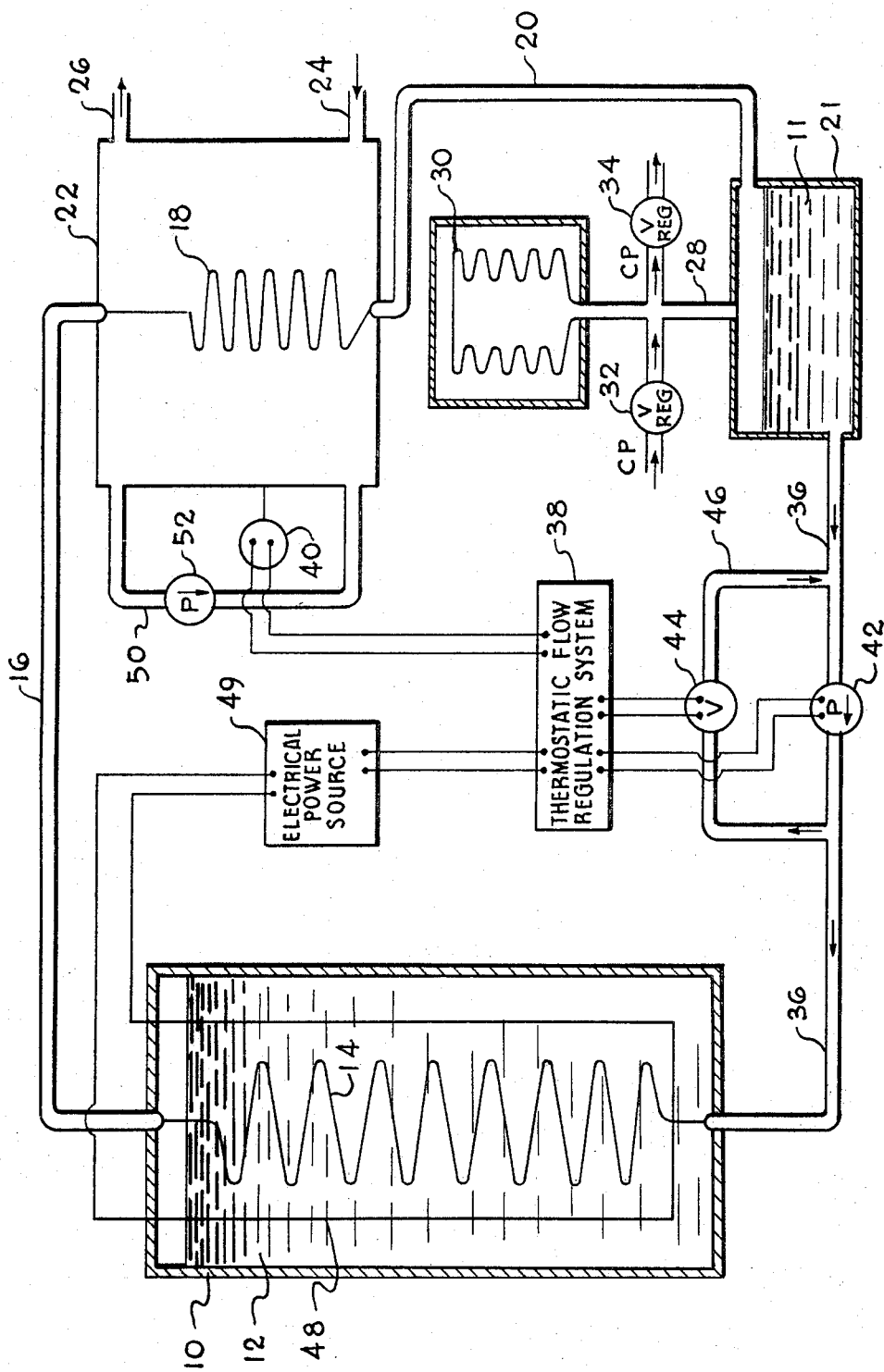

3,411,571
HEAT STORAGE EXCHANGE APPARATUS
AND METHOD THEREFOR
Willis Thompson Lawrence, Arlington, Mass., assignor, by mesne assignments, to Hooker Chemical Corporation, Niagara Falls, N.Y., a corporation of New York
Filed Nov. 7, 1966, Ser. No. 592,476
8 Claims. (Cl. 165—107)

ABSTRACT OF THE DISCLOSURE

A heat transfer system comprising a thermally stable heat storage medium capable of storing heat at widely varying temperatures, a thermally stable heat exchange fluid, a vaporizing passage means for said heat exchange fluid through said heat storage medium, a heat exchange means exterior to said heat storage medium for transfer of heat from the heat exchange fluid to a second fluid, conduit means for said heat exchange fluid extending from the passage through the storage medium to the heat exchange means, a reservoir for said heat exchange fluid connected by conduit means to said heat exchange means and to said vaporizing passage in the heat storage medium, and means in communication with said heat exchange fluid for maintaining a uniform pressure on said heat exchange fluid.

---

This invention relates to a heat storage heat exchange apparatus and more particularly to an apparatus and method for withdrawing heat stored in a heat storage apparatus at a desired rate and the conversion of the withdrawn heat to its end use at a fixed temperature.

Recent developments in the heat storage art have provided methods, compositions, and apparatuses for the storage of relatively large amounts of heat in a relatively small area. However, for the stored heat to serve a useful purpose, it must be capable of being withdrawn on demand and in the quantity desired when needed. To obtain the most beneficial results from the use of a heat storage system, it is particularly desirable to have a means for withdrawing the heat at a rate and quantity which, in many instances, is substantially greater than the rate of heat input into the heat storage medium. Exemplary of such uses are the domestic, commercial and industrial heating of water particularly wherein the demand for heated water is extremely high during certain periods of the day. Previous methods of providing such heated water required extremely large storage tanks for heated water to maintain the desired adequate supply of hot water. However, using a heat storage medium, an equal amount of heat can be stored in a volume up to about one tenth or less than that required to store the heated water.

It is an object of the present invention to provide an apparatus and a method for rapidly extracting heat at a desired rate from a heat storage apparatus. It is another object of the present invention to provide an apparatus whereby the rate at which the heat is withdrawn can be controlled substantially independent of the changing temperature of the heat storage material. A further object of the present invention is to provide a vaporization-condensation heat extraction system whereby a desired heat extraction rate can be maintained over a widely varying temperature of the heat storage medium and whereby the extracted heat can be delivered to its end use at an essentially fixed temperature. These and other objects will become apparent to those skilled in the art from the description of the invention which follows.

In accordance with the invention, a heat transfer system is provided comprising a thermally stable heat storage medium capable of storing heat at widely varying temperatures, a thermally stable heat exchange fluid, a vaporizing passage zone for said heat exchange fluid through said heat storage medium, a heat exchange condensing means exterior to said heat storage medium for the passage of said heat exchange fluid in heat exchange contact with a second fluid, conduit means for said heat exchange fluid leading from said passage in said heat storage medium to said heat exchange means, means in communication with said heat exchange fluid for maintaining a uniform pressure on said heat exchange fluid, a reservoir for said heat exchange fluid and conduit means for the passage of said heat exchange fluid from said heat exchange means to said reservoir and from said reservoir to said vaporizing passage in said heat storage medium.

The present apparatus provides a means for extracting heat at a rapid rate from a heat storage medium thereby making available large amounts of heat on demand. The present apparatus also makes practical the use of relatively slow heating means for the heating of large amounts of fluids in relatively short periods of time. In particular, the use of normal household line voltages and current supplies can be used to heat the heat storage medium over an extended period of time thereby providing sustained or periodic heat withdrawal over a relatively shorter period of time. In addition to providing a means for the rapid heating of water, the present apparatus and method are also particularly useful for providing heated air or other fluids such as non-freezing snow and ice melting fluids. Numerous domestic, commercial and industrial applications will become readily apparent to those skilled in the art from the description of the invention. It will immediately become apparent that the present system can be used whenever heating temperatures of about 100 to 400 degrees Fahrenheit are used.

The invention will be described more fully by reference to the drawing which is a semi-schematic and flow sheet illustrating the apparatus of the present invention.

The present invention is operated utilizing a thermally stable heat exchange fluid and a thermally stable heat storage composition. Thermally stable is used to describe a composition which does not decompose on heating or cooling within the desired heat storage temperature ranges. As such, the heat storage medium is normally a solid or liquid state within the heat storage temperature ranges. The heat exchange fluid is a liquid which preferably is volatilized at the heat storage temperature and condensed at the heat transfer temperature. Thus, a thermally stable liquid having an atmospheric, subatmospheric or superatmospheric boiling point in the range of about 100 to about 800 degrees Fahrenheit and more preferably about 150 to 350 degrees Fahrenheit can be used. Preferably, a liquid with an atmospheric boiling point in the given range is used. Using a vaporization-condensation cycle, a high heat transfer rate is effected with lower flows because the latent heat of vaporization and condensation is used in withdrawing the heat from the heat storage medium. Therefore, the most preferred heat transfer fluids are those having high latent heats.

The most preferred heat transfer fluid is water. Other fluids such as various organic and inorganic thermally stable liquids volatilizing within the given range can also be used. Typical liquids include various aliphatic and aromatic compounds particularly alcohols, halogenated derivatives, ethers and the like as are well known in the art.

Because water is the most preferred heat exchange fluid, the description herein will be directed more particularly to the use of water. However, in describing the use of water, other liquids within the described boiling points can also be used with correspondingly good results.

The present invention is operated by passing heat exchange fluid 11 through a heat storage apparatus 10 containing a heat storage medium 12 heated to a temperature to about 300 to 1200 degrees Fahrenheit. The heat exchange fluid is passed in heat exchange relationship to the heat storage medium 12, such as by means of vaporizing passage 14.

The heat storage medium is preferably an inorganic, substantially anhydrous composition. Various heat storage compositions are well known in the art having varying heat storage capacities and temperatures of operation. The most preferred compositions are alkali metal hydroxide compositions, such as those containing sodium hydroxide, potassium hydroxide, lithium hydroxide and the like. Such compositions are particularly desirable because of the thermal stability and large heat storage capacity over extremely broad temperature ranges.

The heat exchange fluid is vaporized in passing through the heat storage medium 12. A heat exchange vaporizing passage particularly suited for use in heat storage apparatus 10 is described by W. T. Lawrence in copending application Ser. No. 592,450, filed Nov. 7, 1966.

Volatilized gases are withdrawn from heat storage apparatus 10 via conduit 16 and passed to heat exchange means 18 which is in contact with a fluid to be heated. The heat exchange contact with the fluid to be heated effects the condensation of the volatilized heat exchange fluid. The condensed heat exchange fluid is subsequently withdrawn to heat exchange fluid reservoir via conduit 20. Heat exchange means 18 can be a coil or other known heat exchange means particularly suited for the particular fluid to be heated. The fluid to be heated can be a liquid or a gas such as air. When air is the fluid to be heated, heat exchange means 18 can be located in a room, duct, conduit or other enclosure to be heated by the sensible heat liberated in the condensation of the vaporized fluid.

In a preferred embodiment, the present system is used to heat water or other liquid such as a non-freezing ethylene glycol solution or the like used for the melting of ice and snow. Similarly, other liquids can be heated for other purposes in the same manner. When a liquid is the fluid to be heated, heat exchange means 18 is positioned in a contianer 22 having a fluid inlet, which feeds container 22 with replenishing amounts of fluid via conduit 24 and fluid outlet means for the withdrawal of heated fluid as via conduit 26. A preferred condenser used for the heating of liquids is described by W. T. Lawrence in copending United States patent application Ser. No. 592,650, filed Nov. 7, 1966.

Condensed heat exchange fluid 11 withdrawn from heat exchange means 18, is retained in the heat exchange fluid reservoir 21 for eventual recycle to the heat storage apparatus. In communication with the heat exchange fluid reservoir 21 is a pressure regulation system connected by means of conduit 28. The pressure regulation system provides a means for retaining a desired pressure on the heat exchange fluid within predetermined limits. The particular pressure used is chosen in accordance with the particular heat exchange fluid used and the desired temperature of heat transfer, that is, the desired temperature of heat exchange fluid condensation. The pressure is selected to yield a boiling temperature of the heat exchange fluid commensurable with the temperature at which heat is to be delivered to the heat exchange means. Thus, wherein water is the heat exchange fluid, atmospheric pressure is particularly desirable because the temperature of boiling or condensing water is suitable for the heating of most liquids. However, where a higher heat delivery temperature is desired, such as in heating a liquid to a temperature above about 200 degrees Fahrenheit, a higher condensation temperature would be desired and consequently the pressure utilized in the system would be above atmospheric pressure. In the same manner, where a lower condensation temperature is desired, a sub-atmospheric pressure can be utilized to provide the desired condensation temperature.

The pressure regulation system operates utilizing a flexible expansion chamber 30 coupled with a regulator valve as a safety device. In the most preferred method of operation, two regulator valves 32 and 34 are utilized. The regulator valve provides a safety factor in the operation of the system to maintain the predetermined pressure within the desired close limits. In operation, regulator valve 32 opens when the pressure falls to a predetermined low pressure thereby allowing atmospheric or pressurized gases to enter to provide the desired pressure and regulator valve 34 opens when the system exceeds a predetermined pressure to exhaust gases from the heat exchange system. The difference in settings between the two regulator valves determines the limits of the pressure variables within the operating system. Thus, the heat exchange fluid is retained in a substantially closed system which operates predominantly without the intake or exiting of gases therefrom. The normal fluctuations of volume which would normally occur due to thermal expansions of the heat exchange fluid and the vaporization cycle are substantially retained at a constant pressure by means of flexible gaseous expansion chamber 30.

Expansion chamber 30 may be any of many known expansion devices such as inflatable bellows, balloon-type breather bags and the like.

Heat exchange fluid is withdrawn from the fluid reservoir 21 via conduit 36 for recycle to the heat storage apparatus 10 on demand for heat. A thermostat 40 monitors the temperature of the fluid in container 22. Alternatively, the air temperature in the area of the heat exchange means 18 can be monitored when the fluid being heated is air. Optionally, the fluid in container 22 can be circulated to obtain a more uniform temperature by means of conduit 50 and pump 52.

The thermostatic flow regulation system 38 actuates pump 42 which supplies heat storage apparatus 10 with heat exchange fluid. Valve 44 and recycle conduit 46 are optional control means which can be used to further regulate the amount of heat exchange fluid flow to the heat storage apparatus. Valve 44 can be a solenoid valve or other adjustable valve which regulates the flow of recycled heat exchange fluid. When the valve 44 is in the off position, all of the fluid is cycled directly to the heat storage apparatus. By opening valve 44 part of the flow is directed around recycle conduit 46 thus lessening the flow to the heat storage apparatus.

The heat storage medium 12 in the heat storage apparatus 10 is maintained at a temperature above the boiling temperature of the heat exchange fluid. Normally, the temperature is in the range of about 250 to 1200 degrees Fahrenheit and more preferably in the range of about 300 to 900 degrees Fahrenheit. The heat in heat storage apparatus 10 is replenished by resistance heater 48 connected to a source of electrical power 49. Utilizing the heat storage ability of the heat storage medium, the heat replenishment can be effected with normal line voltages over an extended period of time, hence making available large quantities of heat for a more rapid withdrawal over a shorter period of time than could be provided with the electrical heater 48 alone. Although electrical energy is most conveniently used in the present apparatus, other sources of heat can be used to replenish the heat in the heat storage medium. For instance, solar and combustion heat can be used as may be desired.

The following examples illustrate certain preferred embodiments of the present invention. Unless otherwise indicated, all parts and percentages used in the example and claims are by weight and all temperatures are in degrees Fahrenheit.

EXAMPLE 1

A heat storage system was constructed in accordance with the drawing and used for the heating of water. The heat storage apparatus was comprised of 1380 pounds of a substantialy anhydrous alkali metal hydroxide composition comprising about 89 percent sodium hydroxide, 8 percent sodium nitrate and about 2 percent sodium chloride, the remainder being primarily sodium carbonate. The heat storage capacity of this composition was about 550,000 British themal units (B.t.u.'s) at a charged temperature of about 900 degrees Fahrenheit. This corresponded to a heat storage density of about 400 B.t.u.'s per pound of heat storage composition or about 43,500 B.t.u.'s per square foot. Based on a 70 degree temperature rise, the storage capacity of the composition was about 10 times that of water.

The heat storage material was retained in a mild steel container having a coiled vaporizer passage therein with an inlet means at the bottom and an outlet means at the top thereof. Also contained in the heat storage container was a resistance heater drawing 19.5 kilowatts of power. This power source was rated as capable of heating 80 gallons of water per hour through a 100 degree Fahrenheit rise. The heat storage container was insulated to reduce the heat loss to the atmosphere.

Connected to the outlet of vaporizer passage within the heat storage composition was a conduit passing to a second container for water. The conduit was connected to a coiled condenser within the water container. The condenser drained to a reservoir for the heat exchange fluid. A conduit joined the heat exchange fluid reservoir with the inlet end of the vaporizer passage within the heat storage composition. An electrical thermostatically actuated pump supplied the vaporizer passage within the heat storage medium with heat exchange fluid. A by-pass system having a solenoid valve actuated by a thermostatic control in the water container, regulated the flow of heat exchange fluid to the heat storage apparatus. In communication with the heat exchange fluid reservoir was a pressure regulating system adjusted for operation at atmospheric pressure with two safety regulator valves set for about plus and minus one pound of pressure. An expansion bag having a gaseous capacity of about one cubic foot was used in the regulating system which provided capacity for two changes in the gas volume of the rservoir without changing the pressure more than ± one pound per square inch. Water was used as a heat exchange fluid.

The system was operated by passing water at a temperature of about 70 degrees Fahrenheit from the heat exchange fluid reservoir to the heat storage apparatus having an initial heat storage temperature of about 900 degrees Fahrenheit. Water was vaporized and heated to superheated steam at a temperature approaching that of the heat storage composition while passing through the heat storage apparatus. On continued use, the temperature of the heat storage composition decreased as heat was withdrawn at a rate in excess of the heat input. The superheated steam was then passed to the condenser in the water container wherein it was condensed giving up the latent heat of the vaporization, thereby heating the water in the water container. The condenser water was withdrawn from the condenser and passed to the heat exchange fluid reservoir for recycle to the heat storage apparatus.

EXAMPLE 2

Utilizing the system described in Example 1, the heat storage and heat transfer characteristics were determined under various load demands. These tests substantiated a heat exchange rate for the described system capable of heating 250 gallons of water per hour over a 100 degrees Fahrenheit temperature rise for a period of at least two hours before the heating rate began to lessen. This rate was substantially greater than the rated electrical power input of 80 gallons per hour for the resistance heater.

EXAMPLE 3

The system of Example 1 was again used to heat water at a 190 gallons per hour rate through a 100 degree Fahrenheit temperature rise to test the sustained heating rate. After two hours of operation commencing with a 900 degree Fahrenheit heat storage composition the heat output characteristics remained unchanged without supplying additional electrical heat to the heat storage composition. The electrical power was then turned on to supply heat to the heat storage composition at a rate of 19.5 kilowatts. The heat output continued substantially unchanged for an additonal hour and one half before beginning to lessen.

EXAMPLE 4

The system of Example 1 was again tested for heating characteristics to determine the long term heat output for various hot water demands. The system was operated at a water heating rate of 200 gallons per hour heated through a 100 degrees Fahrenheit temperature rise. After two hours of sustained operation, the water heating rate diminished to 180 gallons per hour for a one hour period. Over the next one hour period the rate diminished to 105 gallons per hour at which rate it was sustained in a range of about 110 to 95 gallons per hour for a total of eight hours. The heat storage capacity of the system, even over the extended eight hour period, was substantially improved over that supplied by electrical energy alone.

From the above operational data, it is readily apparent that the present invention is particularly useful for periodic high demands for heat from a relatively low energy heat source. In the same manner, various other thermally stable liquids as those described herein are used by vaporizing the liquid in the temperature range of the heat storage composition and condensing at the heat transfer temperatures wih correspondingly good results.

While three have been described various embodiments of the present invention, the method and apparatus described are not intended to be understood as limiting the scope of the invention as it is realized that changes therein are possible. It is intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A heat transfer system comprising a thermally stable heat storage medium capable of storing heat at widely varying temperatures, a thermally stable heat exchange fluid, a vaporizing passage means for said heat exchange fluid through said heat storage medium, a heat exchange condensing means exterior to said heat storage medium for the passage of said heat exchange fluid in heat exchange contact with a second fluid, conduit means for said heat exchange fluid leading from said passage in said heat storage medium to said heat exchange means, means in communication with said heat exchange fluid for maintaining a uniform pressure on said heat exchange fluid, a reservoir for said heat exchange fluid and conduit means for the passage of said heat exchange fluid from said heat exchange means to said reservoir and from said reservoir to said vaporizing passage in said heat storage medium.

2. The heat transfer system of claim 1 wherein thermostatic means are positioned in contact with said second fluid for controlling the passage of said heat exchange fluid through said heat storage medium.

3. The heat transfer system of claim 1 wherein the heat exchange fluid is water which is vaporized to steam in the vaporizing passage and the heat exchange means for contact with a second fluid is a condenser for said steam.

4. The heat transfer system of claim 1 wherein the second fluid in contact with the heat exchange condensing means is water.

5. The heat transfer system of claim 1 wherein flow regulating means are used to control the rate of heat transfer from said heat storage medium to said heat exchange condensing means by controlling the flow of heat exchange fluid to said heat storage medium.

6. The heat transfer system of claim 5 wherein the regulating means comprises a thermostatically actuated pump for said heat exchange fluid.

7. The heat transfer system of claim 1 wherein the means for maintaining a uniform pressure on said heat exchange fluid comprises a pressure sensitive gaseous expansion chamber.

8. The heat transfer system of claim 7 wherein a pressure regulating valve is used in communication with the expansion means and the exterior of the system.

References Cited

UNITED STATES PATENTS

| | | | |
|---|---|---|---|
| 2,971,746 | 2/1961 | Bell | 165—107 |
| 3,064,649 | 11/1962 | Fuson | 165—107 |
| 3,138,199 | 6/1964 | Bell | 165—105 |
| 3,255,084 | 6/1966 | Doroszlai | 165—107 |

ROBERT A. O'LEARY, *Primary Examiner.*

CHARLES SUKALO, *Assistant Examiner.*